Aug. 12, 1969   W. D. BOYCE II   3,460,504
LANDING SHELLS AND METHOD OF USING
Filed Oct. 19, 1966   3 Sheets-Sheet 1
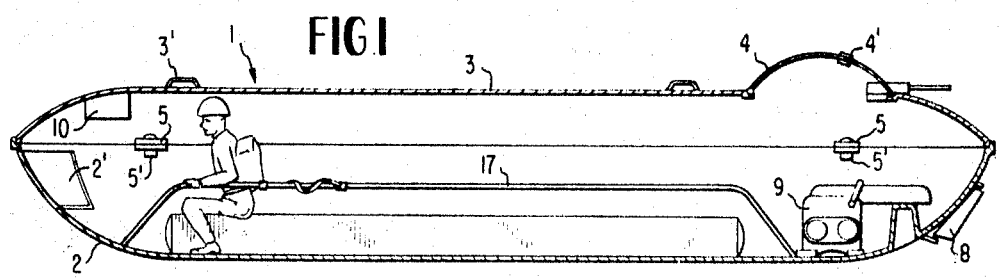
FIG.1
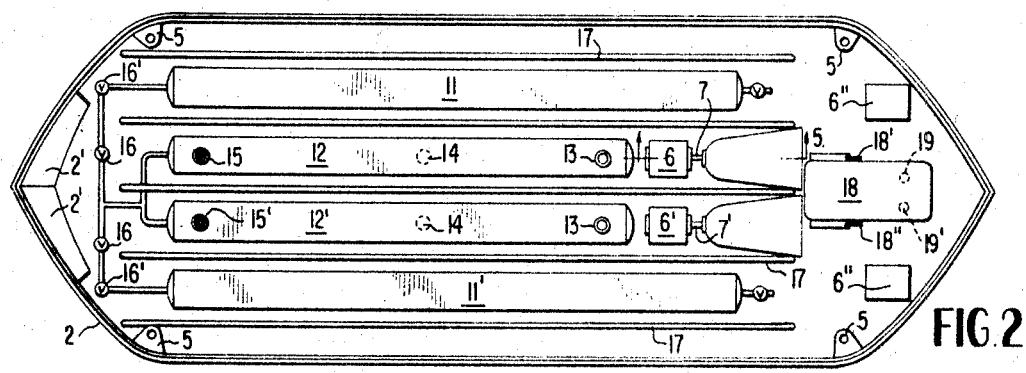
FIG.2
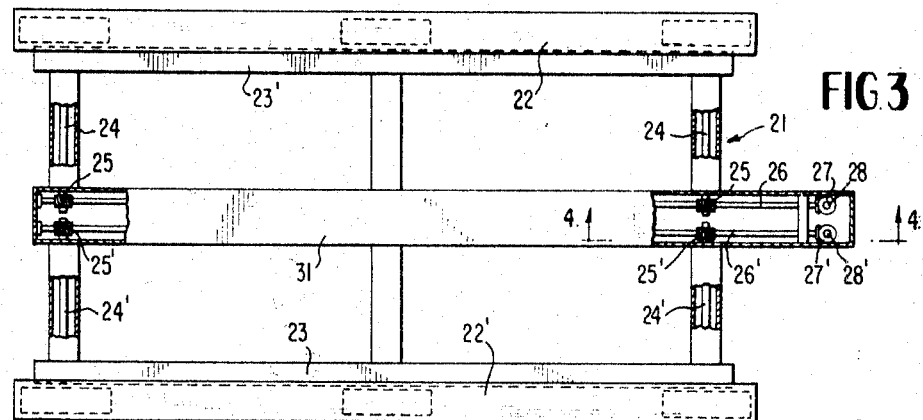
FIG.3
FIG.5 FIG.4
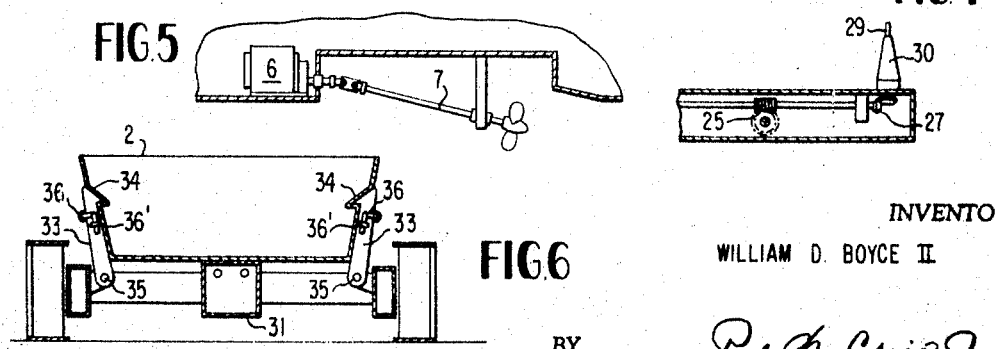
FIG.6
INVENTOR
WILLIAM D. BOYCE II
BY Paul M. Craig, Jr.
ATTORNEYS

INVENTOR
WILLIAM D. BOYCE II
BY
ATTORNEYS

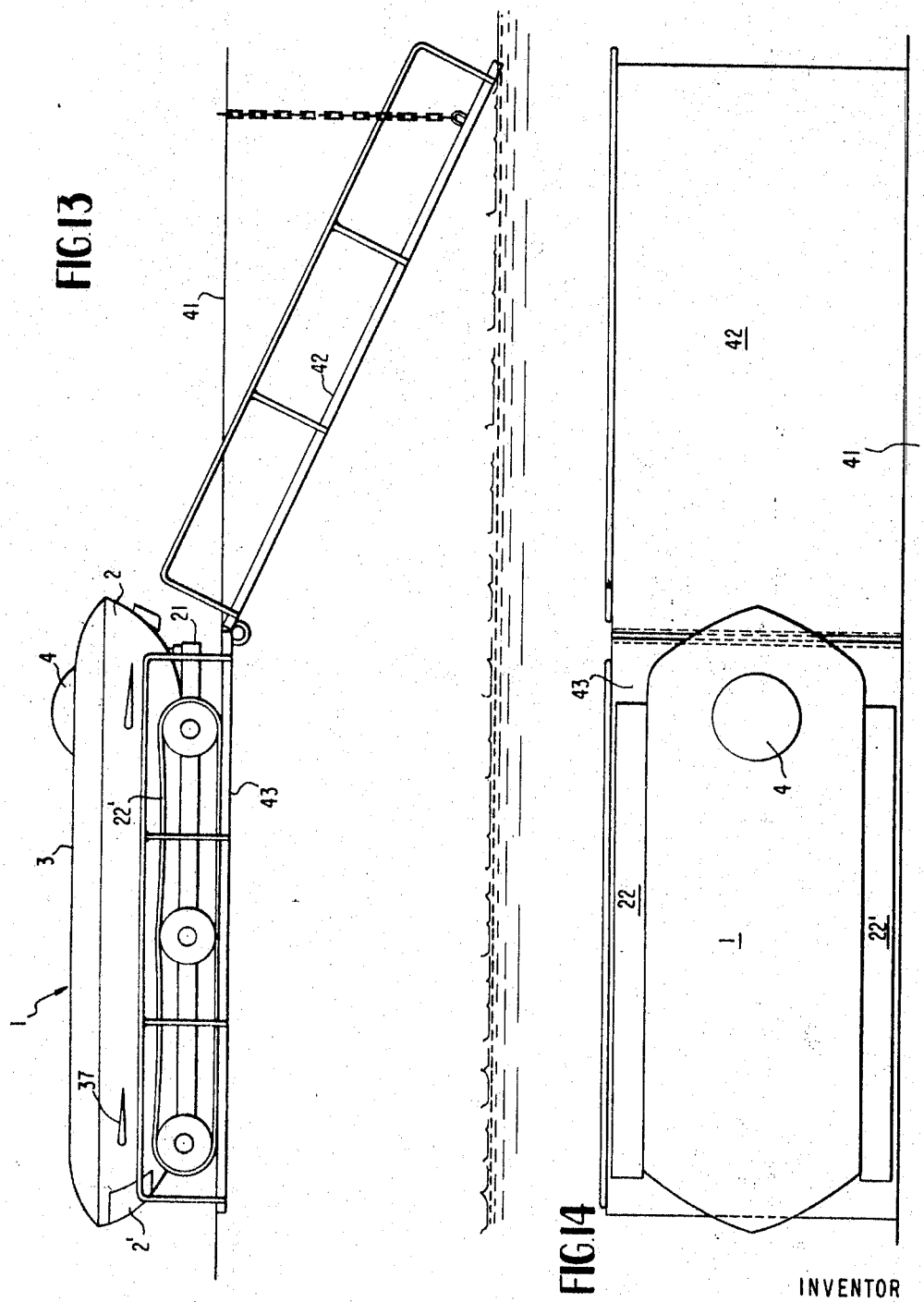

United States Patent Office 3,460,504
Patented Aug. 12, 1969

3,460,504
LANDING SHELLS AND METHOD OF USING
William D. Boyce II, 95 Valmondois, Val d'Oise, France
Filed Oct. 19, 1966, Ser. No. 587,731
Int. Cl. B60f 3/00
U.S. Cl. 115—1
12 Claims

ABSTRACT OF THE DISCLOSURE

A method for transporting combat personnel from ship to shore or vice versa or from ship or shore to inland waters, an apparatus therefor, including submersible landing shells which may be stored aboard ship in a disassembled condition, each landing shell including a lower part and an upper part and means for selectively connecting said lower and upper parts to provide an air-tight seal therebetween. The parts of the landing shell are so constructed as to be stored with the series of upper parts superposed in nested relationship and the series of lower parts similarly arranged. According to an alternative embodiment of the present invention, each landing shell further includes a chassis member provided with traction means, wherein the series of chassis members, like the upper and lower parts of the shells, may be arranged in a stack-like fashion and wherein the chassis members are provided with means for selectively connecting a chassis member with a lower part of a shell.

---

Figure 7:
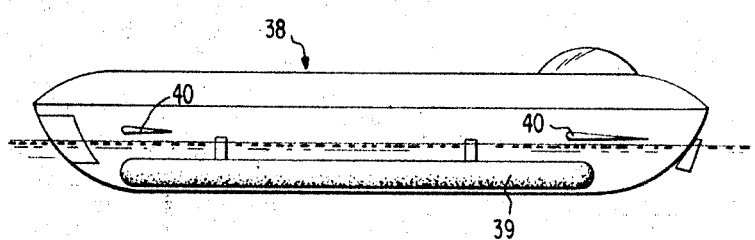

This invention relates to the utilization of water craft in the form of submersible landing shells for quickly transporting combat personnel from ship to shore or vice versa or from ship or shore to inland waters in maximum security from both the sea and the enemy, in maximum secrecy, with minimum time loss and minimum stowage necessary on board ship. The invention further relates to features of the shells per se such as means for selective alternation of the float level thereof, and is also concerned with the connections of the individual shell to a chassis having endless ground contacting tread means, the effect of such selective connections being to convert the landing shell to amphibious use thereof. The invention is thus also concerned broadly with means by which a water craft having a hollow hull is adapted to amphibious use. The invention is also broadly concerned with the utilization of a container, the craft, with its own means of propulsion on land or water but which may further be transported with troops inside with a minimum of danger to those troops regardless of how roughly the unit is handled, it thus being possible to utilize aircraft or winches or ramps which are impossible for previously known craft.

The invention is thus broadly concerned not only with transporting combat troops from ship to shore but also from ship or shore to any adequate inland water in enemy terrain.

A further broad concern of the invention is the utilization of the element water as a protection against enemy surface fire.

The principal object of the invention is the method of utilizing submersible self-propelled landing shells for quickly transferring combat personnel from the deck of a sea-going vessel onto a nearby hostile shore. A further object is the provision of a particular landing shell adapted for utilization in the foregoing method, such shell comprising a lower part and a selectively detachable upper part, together with controllable water ballast means for the purpose of selectively altering the float level of the shell.

A further object of the invention is the provision of a chassis having endless ground contacting tread means or inflatable tires and driving means therefor, said chassis being adapted to be selectively connected to a shell, and the driving means of the chassis being adapted to be selectively connected with power driving connections carried by the shell, thus enabling a continuance of the sea journey of the shell from the ship to points inwardly of the shore.

A further object of the invention is to provide an unsinkable life boat for troops aboard transport ship, for transport of delicate equipment which might be injured by salt water, or for any common boat use.

A further broad object of the invention is the provision of means by which a water craft having a hollow hull is adapted or converted to amphibious use.

Previous designs in landing craft impose certain problems and inconveniences; for example, many of these were open and exposed to the sea and enemy fire and thus easily sunk; they were difficult or impossible to put over the ship's side or to navigate in a high sea; they imposed difficult, slow, inefficient loading of the combat force, the men of this force being usually encumbered with packs and being required to crawl down cargo nets to the craft. Other serious and undesirable considerations are that in most cases the ship is necessarily stopped, thus both informing the enemy of imminent invasion and providing a "sitting duck" target for shore batteries or aircraft and hence causing loss of life of the combat personnel. Citing further undesirables; the operation is usually visible from a long distance; there is a time loss and the presentation of a target, i.e., the landing craft, as the returning coxswains lay off and wait, or make their circle preparatory to further ship contact. Other disadvantages are that valuable space is lost on the ship's deck; time is lost on the davits; there is a bad psychological effect on the troops lined up and waiting to go, possibly for hours, since the ship cannot carry sufficient conventional craft for all troops without those craft returning.

The method of utilizing applicant's submersible self-propelled landing shells for transferring combat personnel from the deck of a seagoing vessel onto a nearby hostile shore will eliminate or at least diminish many of the disadvantages just enumerated.

Further objects, features, and advantages of the present invention will be apparent from the following detailed description thereof, particularly when read with reference to the accompanying diagrammatical drawings in which—

Figure 8:
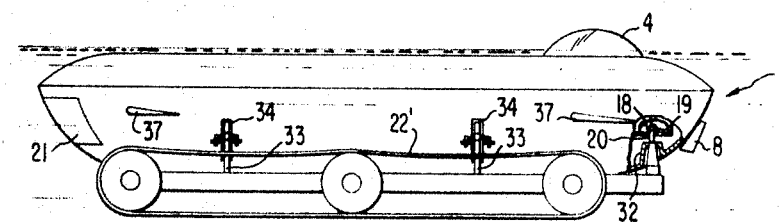
Figure 9:
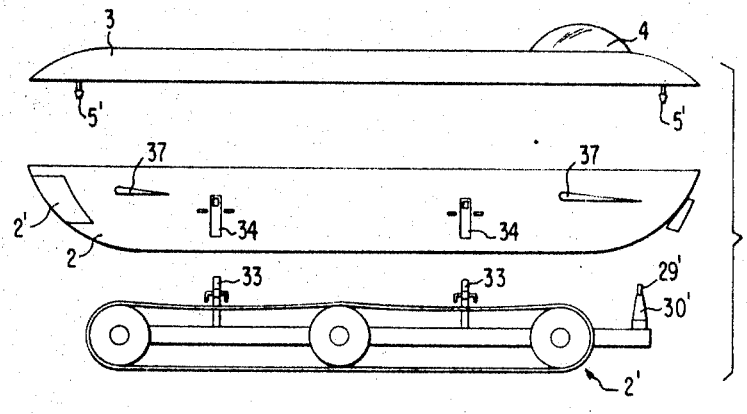
Figure 10:
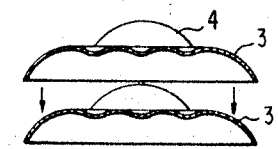
Figure 12:
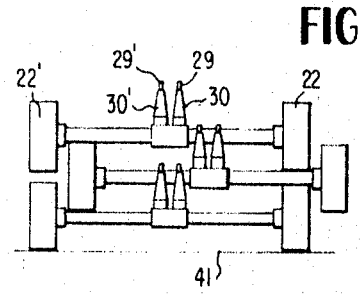
Figure 11:
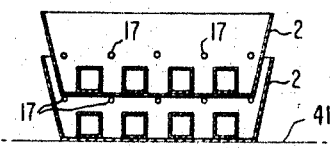

FIGURE 1 shows a longitudinal sectional view of applicant's landing shell member, FIGURE 2 shows a plan view of the lower shell member 2, FIGURE 3 shows a plan view, partly in section of the endless tread chassis member adapted for connection to the lower part of applicant's landing shell, FIGURE 4 is a view partly in section taken on lines 4—4 of FIGURE 3, FIGURE 5 is a view partly in section taken on lines 5—5 of FIGURE 2, FIGURE 6 is a transverse sectional view of a lower shell part and a chassis member in connected position, FIGURE 7 is a side elevation of another form of applicant's landing shell, FIGURE 8 is a side elevation of applicant's landing shell in submerged position and connected to the chassis of FIGURE 3, FIGURE 9 is an exploded view of the parts of the landing shell and of the chassis shown in FIGURE 3, FIGURE 10 shows a stacked arrangement of the upper parts of the landing shell, FIGURE 11 shows a stacked arrangement of the lower parts of the landing shell, and FIGURE 12 shows a stacked arrangement of the chassis, FIGURE 13 is a plan view of a loading ramp means and loading platform means shown diagrammatically, FIGURE 14 is a side elevation view of the ramp and platform means shown in FIGURE 13.

Referring to the drawings, and first particularly to FIGURE 1, applicant's landing shell 1 comprises a lower shell portion 2 provided with conventional openable forward landing hatches 2′, and upper shell portions 3, the latter being provided with attaching member 3′ for lifting cables and the like, and with an upwardly extending bubble member 4 of Plexiglas or the like adapted for receiving the coxswain of the boat and for such additional personnel as a gunner since a gun in bubble member 4 is contemplated as optional equipment. Also contemplated is the provision of fold-up seats (not shown) for supporting the coxswain and gunner. For fastening the lower shell portion and the upper shell portions together, there are provided selectively disconnectible fastening means 5, 5′ of conventional design and accessible from within the interior of the landing shell. It is seen in FIGURES 2 and 5 that applicant's shell is provided with conventional boat-propelling plant means 6, 6′ selectively and conventionally energized by batteries 6″ and propeller shafts 7 and 7′ and as is seen in most of the figures, a conventional rudder 8 is provided. The alternative employment of a Z-drive or other means as a water drive are also contemplated.

In addition to the boat-propelling power plants 6, 6′ or other means there is provided an additional power unit 9 of conventional design which furnishes the power for actuating a selectively operable transmission 18, the latter being discussed more fully hereinafter. The power means 6, 6′, 9 are illustrative only, being only schematically shown and are provided with necessary conventional adjuncts (not shown) to render them selectively operable to perform their intended functions.

One of the advantageous features of applicant's landing shell is the selective alterability of its float level, this being brought about by a selective control of the amount of water in the two water ballast tanks 12, 12′ shown more particularly in FIGURE 2. This control is brought about conjointly by the cooperation of the compressed air in tanks 11, 11′, which compressed air having been supplied to the tanks by a conventional source, the valves 13, 15 and 16 taking part in such cooperation. The valves 13 are selectively operated and communicate with the sea through the bottom of the shell; the valves 14 are check valves communicating with the tanks 12, 12′ through the bottom of the boat to the sea; valves 15 are selectively operated for the purpose of discharging air from the tanks; while valves 16 are selectively operated to facilitate the passage of compressed air from the tanks 11, 11′ to the water ballast tanks 12, 12′. In operation, when it is desired to submerge the shell, the valves 13 are turned in such a direction as to vent the air from these tanks. When a sufficient depth has been reached, the valves 13 and 15 are closed. To regain the surface, the valves 16 are actuated in such a direction as to cause compressed air from the tanks 11, 11′ to enter the tanks 12, 12′ by the conduits shown and water is thereby ejected into the sea through the check valves 14. The control of all valves is in the hands of the coxswain by conventional means (not shown). The arrangement and character of the valves for controlling the float level are substantially that disclosed in the patent to Niehoff, U.S. No. 821,595, May 22, 1906. In order to avoid deleterious effects of gases from the battery 6″ and of noxious odors, there is provided in the air lines communicating with tanks 11 and 11′ a further valve 16′ for the purpose of supplying fresh air to the interior of the shell. A venting air valve 4′ is provided to the bubble member 4 as a purification means for the air breathed by the combat personnel conventional air purification units 10 are disposed within the shell one such unit being diagrammatically shown. It is contemplated that the bubble member 4 be provided with conventional hinging means (not shown) enabling the opening of the member 4 if desired. All of the cylinders furnish convenient seating accommodations for the combat personnel being transported and steadying hand rails 17 are provided adjacent the cylinders as shown more particularly in FIGURE 2. Further contemplated equipment comprises life-belts (not shown) and detachable safety harness shown schematically in connection with the rail 17 in FIGURE 1. The selectively operable transmission 18, previously referred to, is provided for the purpose of selectively and separately driving gear-coupling members 19 and 19′ shown in dotted lines in FIGURE 2, a portion of member 19 with coupling 20 being shown in section in FIGURE 8. A diagrammatic showing of control levers 18′, 18″ for selectively controlling a conventional drive to members 19 and 19′ is made in FIGURE 2, the details of such drive forming as part of applicant's invention. These gear-coupling members are adapted to drive coupling members 29, 29′ as shown in FIGURES 4, 8 and 12 as described hereinafter.

Applicant's invention, as said before, envisions a means by which applicant's landing shell 1 is enabled to not only travel through the water but also to make progress upon dry land. To this end a chassis 21 is provided, the chassis comprising endless treads 22, 22′ or tires (not shown) and longitudinal frame members 23, 23′, together with shafting 24 for driving endless tread 22 and further shafting 24′ for driving endless tread 22′. The tires just referred to, if desired as a substitute, take the place of the driving wheels for the displaced treads 22, 22′. Such tires are large and of a consistency not much greater than that of an inner tube. They are normally maintained in deflated condition, air being admitted to them only just before usage as in a landing operation. The wheels on the intermediate shaft, in the event of the contemplated substitution, while carrying the tires just described, are of the conventional spring support variety. The shafting 24 is driven in turn by gearings 25, 25′ actuated by shaft 26, while shafting 25′ is driven by gearings 25′ actuated by shaft 26. The shafts 26 and 26′ are driven respectively by bevel gearings 27 and 27′, these in turn being actuated by shafts 28 and 28′, the upper ends of which are provided with the coupling members 29, 29′, previously referred to, these being seen in FIGURES 4, 9 and 12. Also, shown in FIGURES 4, 8, 9 and 12 are the bearing and casing members 30 and 30′ surrounding the shafts 28 and 28′. Best shown in FIGURES 3 and 4 is the shafting and gearing casing 31 extending midway longitudinally of the chassis 21 for the purpose of enclosing the gearings 25 and 25′, the shafts 26, 26′ and the gearings 27 and 27′.

In order to effect a cooperative relationship between the lower part 2 and the chassis 21, the part 2 is moved to a position on top of the chassis 21, in which position the gear-coupling members 19 and 19′ drivingly engage the coupling members 29 and 29′ on the ends of the upwardly extending shafts 28 and 28′. Engagement of these coupling members is facilitated by the provision in the lower part 2 of a guide casing 32 as shown in FIGURES 1 and 8, this guide casing being tapered so as to adjustably receive the casings 30 and 30′ housing the shafts 28, 28′ just referred to. At the upper end thereof the casing 32 is provided with apertures for the reception of the upper ends of casings 30 and 30′. Additionally to the driving relationship established as just described, a selectively operable means is provided for securing or fastening the part 2 to the chassis 21. This fastening means comprises a series of members 33 which are pivoted at 35 on the longitudinal members 23, 23′ of the chassis 21. Members 33 are manually moved into and out of position by personnel of the ship or shell and have nose portions which are respectively engageable in indented portions 34 on the port and starboard sides of the lower part 2, each of these nose portions being held in engagement selectively with indented portions 34 by locking means comprising a two-armed locking member 36 rotatably mounted in the member 33 and adapted to make locking engagement of its arms with receiving members 36' mounted on the side of the lower shell portion 2. Due to the centers of gravity of the members 33 lying outwardly of and above the pivots 35, the members 33 will be biased outwardly and downwardly upon disengagement of the locking members 36 with the corresponding members 36'. Also shown in FIGURES 8 and 9 are elevator fins 37 for the purpose of selectively directing approaches of the landing shell from or toward the surface of the water and for maintaining it on an even keel. The fins are controlled by any conventional means (not shown) common to the art.

It is within the purview of applicant's invention that the landing shell 1 be equipped, if desired, with inflatable floats, and an example of this construction is shown in FIGURE 7 which shows a landing shell 38, a substantial counterpart of the landing shell 1, and which is provided with floats of which one float 39 is shown together with the elevator fins 40. The air in the floats is supplied from the compressed air tanks previously described, the quantity of such air being controlled by conventional conduit valve means (not shown).

One of the outstanding characteristics of applicant's method of utilizing his landing shell units to effect a transfer of combat personnel from the deck 41 of the seagoing vessel to a nearby hostile shore is that of speedy performance, and to this end the upper parts 3 and the lower parts 2 are respectively disposed in stacks in nested relationship as shown in FIGURES 10 and 11, it being observed that the hand rails 17 of one of the parts 2 provide a support for the part 2 nested immediately above.

Applicant's method involving only the shells as distinct from the shell-chassis combination comprises the steps of removing in turn the topmost ones of the superposed lower parts 2, loading these parts in turn with the combat personnel, joining and fastening the upper parts 3 to the lower parts, transferring the shells from the deck 41 to the surface of the sea, submerging the shells to a depth in which the sea covers all of the shells except the transparent bubble portion 4, putting the shells in motion and steering them to grounded positions on the hostile shore. The transfer of the shells from the deck to the surface of the sea is readily effected by means of a conventional power-operated raising and lowering devices including booms and cables commonly formed on seagoing vessels and particularly those used in military transports. Other transfer means include helicopters, especially useful for dropping the landing shells in combat zones in inland waters. Further measures for this purpose as shown in FIGURES 13 and 14 comprise ramp means 42 extending downwardly from the deck 41 toward the sea surface, and a loading platform 43 for supporting the shell per se or when joined to the chassis 21 in position preparatory to passage down the ramp. The ramp is joined to the platform by any desired pivotal means, for example hinge means and it may be raised from the position shown by any desired conventional means. Transfer of the shell to the platform may be effected by such ship-carried raising and lowering apparatus as has been previously mentioned.

The work of transferring in turn the topmost ones of the superposed lower parts 2 to the deck 41 or platform 43 joining and fastening the upper parts 3 to the lower parts can be done manually or with the aid of the conventional raising and lowering apparatus just referred to.

It is further contemplated that applicant's landing shells may be transferred from a land base by aircraft and dropped in waters adjacent inland shores.

When it is desired that applicant's landing shells be equipped for ground travel, applicant's method contemplates the steps of transferring the topmost of the series of chassis members shown in FIGURE 12 to a position in which the tread means are in contact with the platform 43 or deck 41, transferring the topmost of the lower parts 2 to a position in which this transferred topmost lower part is supported by the transferred topmost chassis member, the gear-coupling members 19, 19' being in driving connection with the coupling members 29 and 29' on the upwardly extending shaft members 28, 28' of the chassis member 21 as before explained. These coupling connections enable the selective and separate driving control of the shafts 26, 26' by the selective transmission means 18, 18', 18" shown in FIGURES 1 and 2. Further steps in this sequence comprise fastening the chassis members 21 to the lower parts 2, this being accomplished by means of the pivoted retaining members 33 and the locking means 36, 36' as previously referred to. The remaining steps resemble those previously described, that is, they include the assembling of the upper parts 3 to the lower parts 2, transferring the shells with the chassis members from the platform or from the deck of the ship to the surface of the sea, submerging the shell to a level just below sea level, putting the shells in motion, steering the shells onto the hostile shores, and energizing powered drive means 9, 18, 19, 19' to actuate gearing and shaft means 27, 27', 26, 26' to drive the tread means 22, 22' and thereby to carry the shells from the sea inwardly of the hostile shore.

Applicant's invention greatly facilitates the quick transfer of a combat force from the deck of a seagoing vessel to a hostile shore and furthermore enhance the protection of this force from hostile fire. As described herein, all the personnel loading is done on the ship, consequently there is no necessity for landing nets, and no waiting period necessitated by the slow and possibly risky individual movement of men down the side of the ship and into waiting boats below. Applicant's shell is adapted, if such an operation should become necessary, to be "skipped" if dropped from an aircraft.

As an alternative to the self-propulsion feature of applicant's shell, it is contemplated that in lieu of self-propulsion means, a submersible powered "pusher" water craft may be utilized to push the shell through the sea onto the hostile shore.

A further measure contemplated by applicant is the transportation by the landing shell of a portable but powerful crane and winching apparatus to the hostile shore for the purpose of installation in precipitous terrain unsuitable for landing. Such apparatus would thereby make possible the hauling up of the occupied landing shell from a sea environment unfavorable for landing of personnel.

In consonance with the combat missions of the shell, it is contemplated that it be, if necessary, provided with protective armor and also with any desired armament.

While specific embodiments of the invention have been shown and described, it is understood that various alterations of structure and procedure may be made without departure from the spirit of the invention as indicated by the appended claims.

I claim:

1. The method of utilizing submersible self-propelled landing shells for transferring combat personnel from the deck of a seagoing vessel provided with platform means and ramp means to points inwardly of a nearby hostile shore, said shells including a series of duplicate upper parts, one part to each shell, and a series of lower parts, one to each shell, said upper parts being superposed in nested relationship on said deck, said lower parts being superposed in nested relationship on said deck, said lower parts further including powered drive means, a series of chassis members superposed on said deck, each of said chassis members including a plurality of endless tread means or tires, means for driving said tread or tire means, and selectively operated means for fastening said chassis members to said lower parts, said method comprising:

the steps of transferring in turn the topmost of said series of chassis members to a position in which said tread means of said topmost chassis member are in contact with said platform means, transferring the topmost of said lower parts to a position in which said topmost lower part is supported by said chassis member in said first-named position and said powered drive means are in driving connection with said means for driving said tread means, fastening said chassis members to said lower parts, loading said lower parts with said combat personnel, assembling said upper parts to said lower parts, transferring said shells with said chassis members from said platform means to said ramp means and from said ramp means to the surface of the sea, submerging said shells to a level just below sea level, putting said self-propelled shells in motion, steering said shells onto said hostile shore, and energizing said powered drive means to drive said tread means and thereby to carry said shells from the sea inwardly of said shore.

2. Apparatus for effecting the transfer of combat personnel from the deck of a seagoing vessel to a nearby hostile shore or from a shore base to inland shores or to the deck of a seagoing vessel, comprising platform means, a series of self-propelled landing shells, including a series of duplicate upper parts, one part to each assembled shell, and a series of duplicate lower parts, one part to each assembled shell, said upper parts adapted to be superposed in nested relationship upon said platform means, said lower parts, each provided with powered drive means, being similarly adapted to be superposed in nested relationship upon said platform means, means for selectively fastening together one of said upper parts and one of said lower parts to form an assembled landing shell, said means being operable from the interior of said landing shell and effecting and air-tight seal between said upper and lower parts thereof when fastened, air purification means provided within each of said upper parts of said landing shells, means for effecting submergence of said assembled landing shells to a selectively alterable level below the surface of a body of water, and means for controlling the powering, steering and float level of said landing shells.

3. Apparatus according to claim 2, further comprising a series of chassis members each including traction means, said series of chassis members adapted to be superposed in stacked relationship upon said platform means, each chassis member being adapted to be selectively connected with a lower part of a landing shell, said means for controlling the powering and steering of said landing shells being operatively connected with said traction means when said chassis member is connected with a lower part of a landing shell.

4. Apparatus according to claim 3, wherein said traction means includes endless track means.

5. Apparatus according to claim 3, wherein said traction means includes pneumatically-inflated tires.

6. Apparatus according to claim 2, further comprising ramp means pivotably connected with said platform means, said ramp means being thus pivotable to a position whereby assembled landing shells may be conveyed thereon by gravity, from said platform means to the surface of a body of water.

7. Apparatus according to claim 3, further comprising ramp means pivotably connected with said platform means, said ramp means being thus pivotable to a position whereby assembled landing shells may be conveyed thereon by gravity, from said platform means to the surface of a body of water.

8. Apparatus according to claim 2, wherein each of said upper parts of said landing shells includes a transparent bubble-like structure, said bubble-like structure being positioned so as to substantially correspond to the position of said control means, whereby an operator of a landing shell may have a clear field of vision from said bubble-like structure.

9. Apparatus according to claim 2, wherein said means for effecting submergence of said landing shells includes water ballast tank means and compressed air tank means communicating therewith through suitable valve means which are controlled remotely from the interior of said landing shells, and check valve means, selectively controllable to vent said water ballast tank means and said compressed air tank means.

10. Apparatus according to claim 9, wherein said water ballast tank means and said compressed air tank means are positioned longitudinally on the interior of each of said lower parts of said landing shells, thus providing seating space for the personnel to be transported, and further including handrail means extending parallel to said tank means and positioned between adjacent tank means, said handrail means simultaneously serving as support means for the superposed lower part of a landing shell when said lower parts are in a nested relationship.

11. Apparatus according to claim 10, wherein a plurality of body restraining means are attached to said handrail means, spaced appropriately along the length thereof.

12. Apparatus according to claim 3, wherein lower parts of said landing shells are provided with indentations along the exterior thereof, and said chassis members are provided with locking members, pivotably attached to said chassis members and adapted to engage and be secured within said indentations in said lower part of said landing shells.

References Cited

UNITED STATES PATENTS

| | | | |
|---|---|---|---|
| 1,201,877 | 10/1916 | Rydell | 9—31 X |
| 848,872 | 4/1907 | Bailey et al. | 114—16 |
| 1,185,561 | 5/1916 | Walter | 9—4 |
| 2,522,068 | 9/1950 | Stallard | 180—1 |
| 2,685,858 | 8/1954 | Harrison | 114—16 |
| 2,823,636 | 2/1958 | Gongwer et al. | |

FOREIGN PATENTS

| | | |
|---|---|---|
| 249,262 | 3/1926 | Great Britain. |
| 46,074 | 8/1932 | Denmark. |
| 542,581 | 1/1942 | Great Britain. |

ANDREW H. FARRELL, Primary Examiner

U.S. Cl. X.R.

114—70